(12) United States Patent
Wintermantel et al.

(10) Patent No.: US 12,372,343 B2
(45) Date of Patent: Jul. 29, 2025

(54) DEVICE AND METHOD FOR MEASURING AN OBJECT (71) Applicant: SICK AG, Waldkirch (DE)

(72) Inventors: Johannes Wintermantel, Waldkirch (DE); Linda Kagelmacher, Waldkirch (DE)

(73) Assignee: SICK AG, Waldkirch (DE)

( * ) Notice: Subject to any disclaimer, the term of this patent is extended or adjusted under 35 U.S.C. 154(b) by 859 days.

(21) Appl. No.: 17/582,306

(22) Filed: Jan. 24, 2022

(65) Prior Publication Data

US 2022/0252386 A1 Aug. 11, 2022

(30) Foreign Application Priority Data

Feb. 9, 2021 (EP) .................................... 21155922

(51) Int. Cl.
*G01B 11/00* (2006.01)
*G01B 11/04* (2006.01)
*G01S 17/58* (2006.01)

(52) U.S. Cl.
CPC ............ *G01B 11/043* (2013.01); *G01S 17/58* (2013.01)

(58) Field of Classification Search
USPC ....................................................... 356/28.5
See application file for complete search history.

(56) References Cited

U.S. PATENT DOCUMENTS

| | | | |
|---|---|---|---|
| 6,759,671 B2 * | 7/2004 | Liess | G01P 3/366 250/559.32 |
| 7,283,214 B2 | 10/2007 | Xu et al. | |
| 8,751,091 B2 * | 6/2014 | Moench | G01S 7/4916 356/3 |

(Continued)

FOREIGN PATENT DOCUMENTS

| | | |
|---|---|---|
| EP | 1261877 B1 | 2/2010 |
| EP | 3035001 A1 | 6/2016 |

(Continued)

OTHER PUBLICATIONS

O. Mikami and C. Fujikawa, "3-Beam laser Doppler velocimeter for 3-D velocity measurement," 2016 IEEE 6th International Conference on Photonics (ICP), Kuching, Malaysia, 2016, pp. 1-3 (Year: 2016).*

(Continued)

*Primary Examiner* — James R Hulka
(74) *Attorney, Agent, or Firm* — Nath, Goldberg & Meyer; Jerald L. Meyer (57) ABSTRACT

The invention relates to a device and to a method for measuring an object that moves in a direction of movement along a movement axis, wherein the device has a first sensor arrangement having a first SMI sensor and a second SMI sensor, wherein the SMI sensors irradiate measurement light beams in opposite directions along a movement axis. A control and evaluation unit is configured to receive first and second measured signals, to determine a speed of the object along the movement axis from at least one of the measured (Continued)

signals, to detect a first characteristic change of the second measured signal, a first characteristic change of the first measured signal, and a second characteristic change of the first measured signal, and to determine an object length of the object along the movement axis.

16 Claims, 4 Drawing Sheets

(56) References Cited

U.S. PATENT DOCUMENTS

| | | | |
|---|---|---|---|
| 10,379,028 B2 | 8/2019 | Spruit et al. | |
| 11,054,244 B2* | 7/2021 | Ouweltjes | G01S 7/493 |
| 11,187,643 B2* | 11/2021 | Jutte | G01N 15/1431 |
| 11,280,714 B2* | 3/2022 | Momtahan | G01N 15/1434 |
| 11,692,925 B2* | 7/2023 | Spruit | G01N 15/06 |
| | | | 356/28.5 |
| 2003/0016365 A1* | 1/2003 | Liess | G01S 7/4811 |
| | | | 356/498 |
| 2007/0091295 A1* | 4/2007 | Xu | G01C 3/08 |
| | | | 356/5.15 |
| 2011/0035093 A1* | 2/2011 | Moench | G01S 17/88 |
| | | | 701/31.4 |
| 2018/0224368 A1* | 8/2018 | Spruit | G01N 15/1434 |
| 2019/0285537 A1* | 9/2019 | Spruit | G01N 15/06 |
| 2019/0346360 A1* | 11/2019 | Jutte | G01N 15/0205 |
| 2020/0064249 A1 | 2/2020 | Momtahan et al. | |
| 2020/0096314 A1* | 3/2020 | Ouweltjes | G01S 7/4916 |

FOREIGN PATENT DOCUMENTS

| | | | |
|---|---|---|---|
| JP | 2022527563 A * | 6/2022 | G01N 15/1459 |
| WO | 2009113001 A1 | 9/2009 | |
| WO | WO-2020207908 A1 * | 10/2020 | A62B 18/006 |

OTHER PUBLICATIONS

A. A. Ibrahim, S. Ambran, F. Ahmad, O. Mikami and C. Fujikawa, "Velocity Measurement by Self-Mixing Laser Diode Using Direct Modulation," 2018 IEEE 7th International Conference on Photonics (ICP), Langkawi, Malaysia, 2018, pp. 1-3 (Year: 2018).*

Pruijmboom, A., et al., "VCSEL-based minature laser-Doppler interferometer", Proceedings of SPIE, 6908, Vertical-Cavity Surface-Emitting Lasers XII, 690801, Jan. 29, 2008.

Giuliani, G., et al., "Laser diode self-mixing technique for sensing applications", Journal of Optics A: Pure and Applied Optics, Nov. 4, 2002, S283-S294, 4, Institute of Physics Publishing, United Kingdom.

European Search Report for corresponding application 21155922.4 issued Jul. 16, 2021.

* cited by examiner

DEVICE AND METHOD FOR MEASURING AN OBJECT

The invention relates to a device and to a method for measuring an object.

A technology based on laser light in which a moving object is illuminated with a measurement beam of coherent laser light is described in the scientific publication "VCSEL-based miniature laser-Doppler interferometer" (Proc. SPIE 6908, Vertical-Cavity Surface-Emitting Lasers XII, 690801 (29 Jan. 2008); https://doi.org/10.1117/12.775131). A portion of the transmitted light is diffusely reflected at the surface of the moving object and so returns to the laser, with this diffusely reflected portion of the transmitted light undergoing a phase offset with respect to the transmitted light due to the Doppler effect caused by the movement of the object. Self-mixing interference results between the transmitted light and the light reflected back in the laser resonator, whereby a periodic oscillation of the intensity of the laser is produced. A modulated measured signal is thereby generated. A speed and a direction of the moving object can be detected using the frequency change and the signal shape of the intensity. The basic principle and different application possibilities of this principle of action called "self-mixing interference" (SMI) are also described for example, in the scientific publications" Laser diode self-mixing technique for sensing applications" (Guido Giuliani et al 2002 J. Opt. A: Pure Appl. Opt. 4 S283, https://doi.org/10.1088/1464-4258/4/6/371) and "Laser feedback interferometry: a tutorial on the self-mixing effect for coherent sensing" (Thomas Taimre et al, Adv. Opt. Photon. 7, 570-631 (2015), https://doi.org/10.1364/AOP.7.000570).

The use of a sensor working according to the SMI principle of action (called an SMI sensor in the following) for measuring a movement of a sheet of paper relative to the SMI sensor is disclosed in EP 1 261 877 B1. To improve the speed measurement, a sensor arrangement having two SMI sensors is proposed whose measurement axes are arranged with opposite angles with respect to a normal to the movement plane of the paper web. Respectively opposite interference effects are thus produced in the two SMI sensors. The amount of the speed can thereby be determined by subtracting the detector signals, while the direction of movement can be determined by comparing the asymmetries of the detector signals. However, in EP 1 261 877 B1 only a movement measurement of planar, that is two-dimensional objects such as sheets of paper are disclosed; an absolute length determination, in particular of three-dimensional objects, does not take place.

In EP 3 035 001 A1, a device for the absolute position determination of a moving object is shown that is likewise based on the use of SMI sensors. Code markings arranged on a surface of the object generate a characteristic amplitude change of the sensor signal on detection by the SMI sensor and thus enable a position determination of the object. It is disadvantageous in this respect that the objects have to be provided with corresponding code markings.

An SMI sensor can only determine radial speeds of scanned object points, that is the speed of the respectively scanned object point of a moved object in the direction of a measurement axis of the SMI sensor. The speed of the object in the direction of movement can then be determined using the angle between the measurement axis of the SMI sensor and the direction of movement of the object. If an object, for example in the form of a parallelepiped, moves through a measurement axis of an SMI sensor, a transition of the measurement beam from a side surface to a top surface of the parallelepiped cannot be determined from the speed measurement of the SMI sensor since the radial speed determined by the SMI sensor remains the same independently of whether the side surface or the top surface of the parallelepiped is scanned. A detection of an edge of the parallelepiped is therefore not possible in this manner.

A similar problem results when the object is located on a transport medium, for example a conveyor belt. The transport medium typically moves at the same speed as the object on the transport medium; the SMI sensor therefore always measures the same speed, irrespective of whether it scans the transport medium or the object disposed thereon. To nevertheless be able to recognize objects on the transport medium, further sensors, for example light barriers, are therefore typically used to recognize objects on the transport medium. If an object on the transport medium interrupts the light barrier, the length of the object in the direction of movement of the transport medium can be determined from the length of the interruption and the object speed determined by the SMI sensor.

It is therefore an object of the invention to further develop an arrangement of SMI sensors such that it is suitable for the length determination of moved three-dimensional, in particular parallelepiped-shaped objects, without having to use data of further sensors or special markings on the objects.

The object is satisfied in accordance with the invention by a device and a method for the contactless measurement of an object moving along a movement axis having the features of the respective independent claim.

The invention starts from the basic idea of enabling a dimension of three-dimensional objects, in particular lengths of parallelepiped-shaped objects, moving in a movement axis disposed in a movement plane by a skillful evaluation of measured signals of the SMI sensors with a sensor arrangement having two self-mixing interference sensors (SMI sensors) that emit opposite measurement light beams.

The device in accordance with the invention for measuring objects moving in a movement plane along a movement axis comprises a first sensor arrangement having a first self-mixing interference sensor (SMI sensor) for transmitting first measurement light beams along a first measurement axis. The first SMI sensor has a first working zone along the first measurement axis, with first measurement light beams reflected back from the first working zone to the first SMI sensor generating a first measured signal in the first SMI sensor. The first SMI sensor is oriented such that the transmitted first measurement light beams run at least in part in the direction of movement of the object, that is have a component in parallel with the movement axis and in the direction of movement. The first measurement axis therefore forms a first angle with a plane perpendicular to the movement axis.

The first sensor arrangement further comprises a second SMI sensor for transmitting second measurement light along a second measurement axis. The second SMI sensor has a second working zone along the second measurement axis, with second measurement light beams reflected back from the second working zone to the second SMI sensor generating a second measured signal in the second SMI sensor. The second SMI sensor is oriented such that the transmitted second measurement light beams run at least in part against the direction of movement of the object, that is have a component in parallel with the movement axis and opposite the direction of movement. The second measurement axis therefore forms a second angle with a plane perpendicular to the movement axis, said second angle differing at least by sign from the first angle that the first measurement axis forms with the plane perpendicular to the movement axis.

The SMI sensors are configured such that only the measurement light beams reflected by from the working zones of the SMI sensors generate measured signals that are supplied to further processing. The working zones each have an end facing the SMI sensor and an end remote from the SMI sensor. The extent of the working zones can be due to the principle, for example in that the intensity of measurement light beams reflected back is no longer sufficient to generate a measured signal from a certain distance of the SMI sensor onward due to material properties of the objects to be measured. The center of a working zone can lie, for example, in the region of the beam waist of the measurement light beam. Alternatively, the working zones can be bounded by the transport medium on the sides of the working zones remote from the SMI sensors. The ends of the working zones remote from the SMI sensors are then points of intersection of the measurement axes of the sensors with the transport medium. The length of the working zones can also be set by corresponding distance filters of the SMI sensors.

The distance between the ends of the working zones remote from the SMI sensors in parallel with the movement axis of the object defines a measurement distance having a measurement distance length, wherein the measurement distance length has a positive amount when the end of the first working zone remote from the first SMI sensor is arranged upstream of the end of the second working zone remote from the second SMI sensor in the direction of movement. The measurement distance length has a negative amount when the end of the first working zone remote from the first SMI sensor is arranged downstream of the end of the second working zone remote from the second SMI sensor in the direction of movement.

The device further comprises a control and evaluation unit for receiving the first and second measured signals and for determining a speed along the movement axis from at least one of the measured signals. Alternatively, a determination of the speed from the measured signals can already take place in the SMI sensors.

The speed can be both the speed of the objects to be measured and the speed of the transport medium if the latter is in the working zone.

The control and evaluation unit is configured to detect a first characteristic change of the first measured signal at a first time, a first characteristic change of the second measured signal at a second time, and a second characteristic change of the first measured signal at a third time.

A global change of the measured signal is to be understood as a characteristic change of the measured signal of the SMI sensor. It can, for example, be a change of the total intensity of the modulated SMI measured signal described in the prior art specified in the introduction. A change of the total intensity can occur on reflection of the measurement light from surfaces of different reflectivity, for example when the SMI sensor senses both the transport medium and objects located on the transport medium and the reflection behavior of the transport medium differs from that of the objects to be detected such that a significant change of the total intensity, that is a change of the total intensity going beyond signal noise, occurs if an object is sensed instead of the transport medium.

A global change of the measured signal can also comprise a digital change, that is a presence or absence of an SMI measured signal. It can occur, for example, when the transport medium is located outside a working zone of the SMI sensor. The measurement light reflected back from the transport medium is then not sufficient to generate interference in the SMI sensor, that is it is not sensed by the SMI sensor. A measured signal is only generated in this case when an object enters into the working zone of the SMI sensor.

For determining a length of the object, the control and evaluation unit is configured to determine a length of the object along the movement axis while using the first time, the second time, the third time, the determined object speed, and the measurement distance length.

The invention has the advantage that both the speed and a length of the object can be determined by the device without a further sensor or special markings on the object being necessary.

A one-time speed determination, for example in a time period between the first time and the third time, is in particular sufficient for the determination of the length of the object with a uniform movement of the object. The control and evaluation unit can furthermore be configured to store the speeds determined over time. An exact length determination of the object can thereby also take place at a non-uniform speed.

In the case of a uniform movement at a constant speed, the control and evaluation unit can be configured to determine a length value from a first time difference between the third time and the first time and from the constant speed and to determine the length of the object along the movement axis by adding the length value and the measurement distance length.

For a more exact length determination, the control and evaluation unit can additionally or alternatively be configured to determine the length value at variable speeds by temporal integration of the speeds determined between the first time and the third time and to determine the length of the object along the movement axis by adding the length value and the measurement distance length.

The control and evaluation unit can be designed as an integral part of the sensor arrangement, as an external unit, or as a part of the SMI sensors.

The control and evaluation unit can have an interface for outputting the received data and/or for outputting the object length, for example to a display unit or to a higher ranking control.

The measurement axes of the first and second SMI sensors can have the same angles with respect to the plane perpendicular to the movement axis, preferably the same by amount. The data processing is simplified by such a symmetrical arrangement.

The measurement axes of the first and second SMI sensors can preferably lie in a common measurement plane. The movement axis of the object can preferably lie in the common measurement plane. The data processing is further simplified by this geometrical arrangement. The first and second SMI sensors can be arranged such that their measurement axes intersect at a point of intersection in the common measurement plane. The point of intersection can here lie at the center of the working zones of the SMI sensors.

The measurement axes of the first and second SMI sensors can lie in parallel measurement planes in an alternative embodiment. Interference signals due to reflection of the measurement beams at optics of the respective other SMI sensor are prevented by this geometrical arrangement. The movement axis of the object can preferably lie between the measurement planes. The first and second SMI sensors can be arranged such that the distance of the centers of the working zones of the SMI sensors is minimal.

In an embodiment, the transport medium can lie in at least one working zone of the SMI sensors. A speed of the transport medium can thus be determined.

In an alternative embodiment, the transport medium can lie outside the working zones of the SMI sensors. This has the advantage that a more reliable object detection can take place since only measured signals of objects on the transport medium are detected, but not of the transport medium itself.

The measurement distance length can be determined in a teaching process, for example using a measurement body of a defined length, with the measurement body having a reflectivity that corresponds to the reflectivity of the objects to be measured within customary tolerances. If the SMI sensors are arranged such that their working zones are bounded by the transport medium, the measurement distance length results from the distance of the points of intersection of the measurement light beams with the transport medium.

The control and evaluation unit can determine the speed of the object along the movement axis while using the first or second measured signals, with a mean value of the speed acquired by the two sensors being able to be formed or with the measured signals for determining the speed being subtracted as described in EP 1 261 877 B1. A more exact speed determination is thereby made possible.

In an embodiment of the invention, a second sensor arrangement can be provided that has third and fourth SMI sensors, with the measurement axes o the third and fourth SMI sensors preferably being able to be aligned in parallel with the measurement axes of the first and second SMI sensors. The use of a second sensor arrangement has the advantage that not only a dimension can be determined, but also an alignment of the object on the transport medium by comparing temporal extents of characteristic signal changes in the first sensor arrangement and in the second sensor arrangement.

The invention will be explained in detail in the following with reference to embodiments and to the drawings. The same parts in the drawings are provided with the same reference numerals here. There are shown in the drawings.

Figure 1:
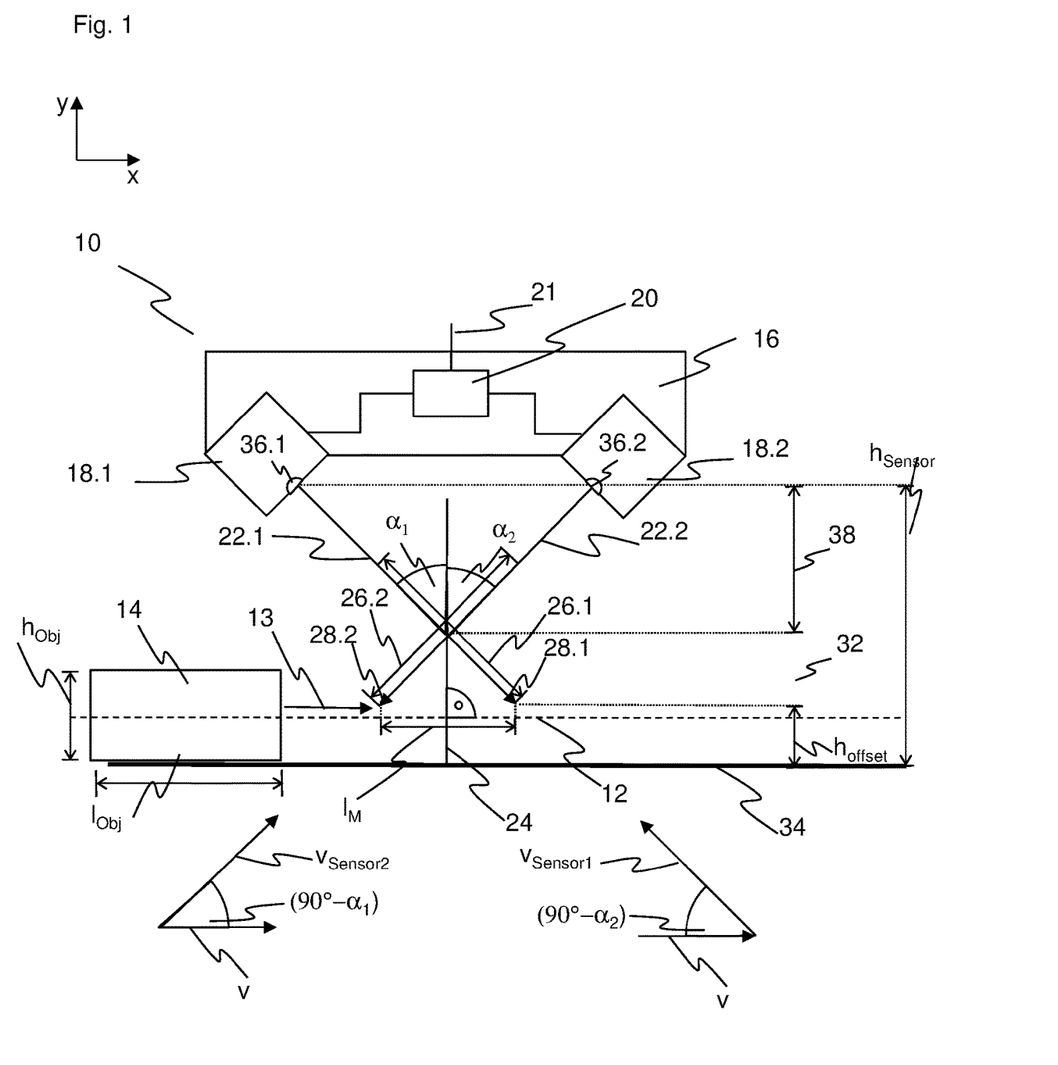
FIG. 1 a device in accordance with the invention for measuring an object moving along a movement axis.

FIG. 1 shows a device 10 in accordance with the invention for measuring an object 14 moving at a speed v along a movement axis 12 in a direction of movement 13. The device 10 comprises a first sensor arrangement 16 having a first self-mixing interference sensor (SMI sensor) 18.1 and a second SMI sensor 18.2 as well as a control and evaluation device 20 for controlling the SMI sensors 18.1, 18.2 and for receiving and/or evaluating measured signals 44, 48 of the SMI sensors 18.1, 18.2. The control and evaluation device 20 has an interface 21 for forwarding the measured signals and/or evaluation results. The interface 21 can also be configured to receive control signals of a higher ranking control. The first SMI sensor 18.1 transmits measurement light beams from an aperture 36.1 along a first measurement axis 22.1 that has a first angle $\alpha_1$ with respect to a plane 24 perpendicular to the movement axis 12. The second SMI sensor 18.2 transmits measurement light from an aperture 36.2 along a second measurement axis 22.2 that has a second angle $\alpha_2$ with respect to a plane 24 perpendicular to the movement axis 12. The angles $\alpha_1$, $\alpha_2$ are directed angles having an orientation that is specified via a sign before the amount of the angle. In the embodiment, the angles have the same amount; $\alpha_2=-\alpha_1$ applies. The measurement axes 22.1, 22.2 can furthermore lie in a common measurement plane; the plane of the drawing in the embodiment. If, as in the embodiment, the movement axis 12 lies in or in parallel with the measurement plane, the speed v of the object 14 results from the speeds $v_{Sensor1}$, $v_{Sensor2}$ determined by the SMI sensors 18.1, 18.2 in accordance with the formulas $$v=v_{Sensor_1} \cos(90-\alpha_1)$$

or $$v=v_{Sensor_2} \cos(90-\alpha_2)$$

The first SM! sensor 18.1 and the second SMI sensor 18.2 each have a first working zone 26.1 and a second working zone 26.2 along the measurement axes 22.1, 22.2, with only measurement light beams reflected back from the working zones 26.1, 26.2 generating measured signals 44, 48 that are supplied to further processing. The end 28.1 of the first working zone 26.1 remote from the first SMI sensor 18.1 and the end 28.2 of the second working zone 18.2 remote from the second SMI sensor 18.2 define a measurement distance in parallel with the movement axis 12 of the object 14 having a measurement distance length $I_M$. Since, in the embodiment, the end 28.1 of the first working zone 26.1 remote from the first SMI sensor 18.1 is disposed downstream of the end 28.2 of the second working zone 26.2 remote from the second SMI sensor 18.2 in the direction of movement 13 of the object 14, the measurement distance length $I_M$ enters into a determination of the object length $l_{Obj}$ with a negative amount.

The first sensor arrangement 16 is arranged at a height $h_{Sensor}$ measured from the apertures 36.1, 36.2 of the SMI sensors 18.1, 18.2 above a transport medium 34 on or with which the object 14. moves. In the embodiment, the ends 28.1, 28.2 of the working zones 26.1, 26.2 remote from the SMI sensors 18.1, 18.2 lie at a distance $h_{offset}$ above the transport medium 34 so that the transport medium 34 is not detected by the SMI sensors 18.1, 18.2. The vertical distance 38 of the apertures 36.1, 36.2 of the SMI sensors 18.1, 18.2 from the point of intersection of the measurement axes 22.1, 22.2 is called the standoff distance (SD).

Figure 2:
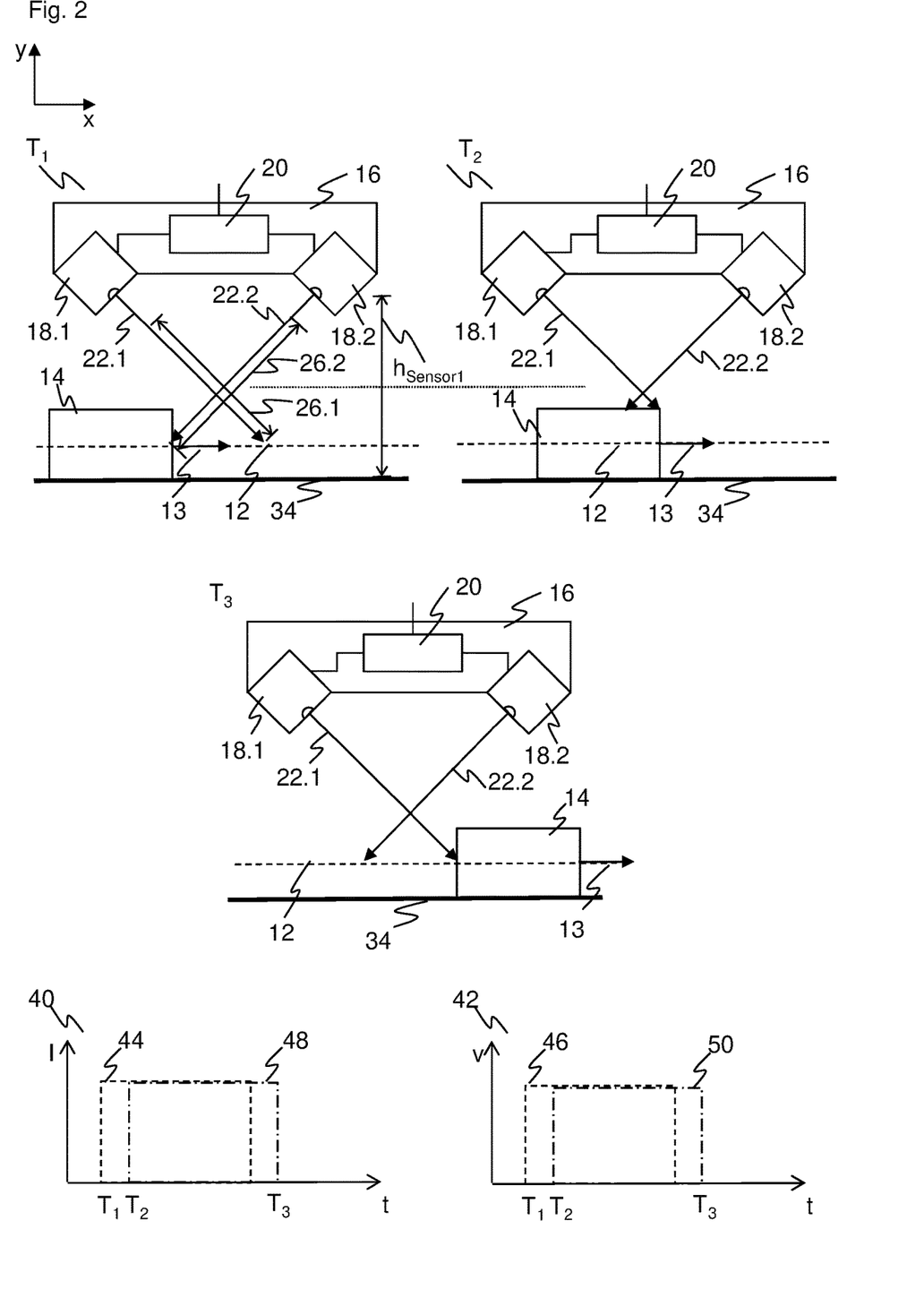
FIG. 2 an exemplary scanning of an object by a device in accordance with the invention at different times with a transport medium disposed outside the working zones of the SMI sensors.

FIG. 2 schematically shows a first example of the functional principle of the device in accordance with the invention. The sensor arrangement 16 is arranged at a first height $h_{Sensor1}$ above the transport medium 34, for example a conveyor belt, such that the transport medium 34 is not disposed in the working zones 26.1, 26.2 of the SMI sensors 18.1, 18.2. The transport medium 34 thereby does not generate any intensity signal in the SMI sensors 18.1, 18.2, as shown in the intensity-time diagram 40 in the lower left corner of FIG. 2. The SMI sensors 18.1, 18.2 of the sensor unit 16 thus also do not deliver any speed signals, as shown in the lower right corner in the speed-time diagram 42 of FIG. 2.

At a first time $T_1$, the object 14 that moves along the movement axis 12 on the transport medium 34 enters into the second measurement axis 22.2 of the second SMI sensor 18.2. Measurement light beams that were transmitted by the second SMI sensor 18.2 are reflected from the object 14, move at least in part along the second measurement axis 22.2 back to the second SMI sensor 18.2, and there generate a second measured signal 44 with an intensity I (dashed line in the intensity-time diagram 40). At the time $T_1$, a first characteristic change of the second measured signal 44 therefore takes place, namely an abrupt change of the intensity from a value below a detection level to a value at which the second SMI sensor 18.2 can determine a speed v so that the speed-time diagram 42 also shows a second sped signal 46 differing from zero (dashed line in the speed-time diagram 42) from the time $T_1$ onward.

Measurement light beams also transmitted by the first SMI sensor 18.1 at a second time $T_2$ are reflected from the object 14, move at least in part along the first measurement axis 22.1 back to the first SMI sensor 18.2 and there here generate a second measured signal 48 with an intensity I (dashed line in the intensity-time diagram 40). At the time $T_2$ a first characteristic change of the first measured signal 48 therefore takes place analog to the change of the second measured signal 44 at the time $T_1$. Accordingly, the first SMI sensor 18.1 now also delivers a second speed signal 50 differing from zero (chain-dotted line in the speed-time diagram 42).

At a third time $T_3$, the object 14 exits the first measurement axis 22.1 of the first SMI sensor 18.1. A second characteristic change of the first measured signal 48 thus takes place whose intensity likewise again falls to a value below the detection level so that a first speed signal 50 is also no longer present.

At a constant object speed $v_{const}$, the object length $l_{Obj}$ results from geometrical considerations as $$l_{Obj}=(T_3-T_1) \cdot v_{const}+l_M$$

where $l_M$ designates the measurement distance length of the sensor arrangement 16. Since, in the embodiment, the end 28.1 of the first working zone 26.1 remote from the first SMI sensor 18.1 is disposed downstream of the end 28.1 of the second working zone 26.2 remote from the second SMI sensor 18.2 in the direction of movement 13 of the object 14, the measurement distance length $l_M$ enters into a determination of the object length $l_{Obj}$ with a negative amount, that is it is deducted from the length that results from the difference of the times $T_3$ and $T_1$.

At a variable object speed $v_{var}$, the object length $l_{Obj}$ can be determined using a time-dependent variable object speed $v_{var}(t)$ stored over the time in the SMI sensors 18.1, 18.2 or in the evaluation unit 20:

$$l_{Obj}=\int_{T_1}^{T_3} v_{var}(t)dt+l_M$$

then applies.

Figure 3:
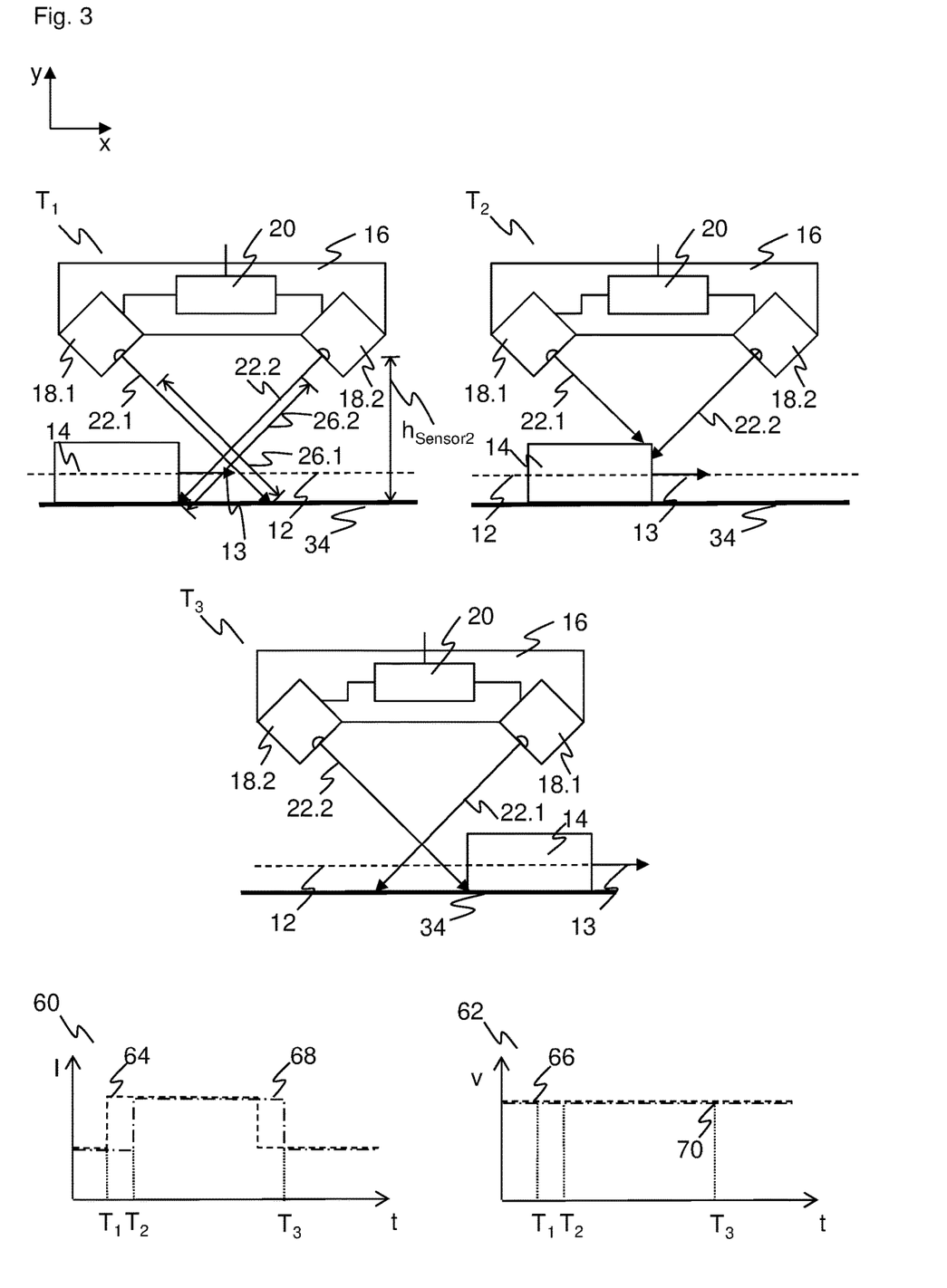
FIG. 3 a scanning of an object by a device in accordance with the invention at different times with a transport medium disposed within the working zones of the SMI sensors.

FIG. 3 schematically shows a second example of the functional principle of the device in accordance with the invention. The sensor arrangement 16 is arranged at a second height $h_{Sensor2}$ above the transport medium 34 such that the transport medium 34 is disposed in the working zones 26.1, 26.2 of the SMI sensors 18.1, 18.2. The transport medium 34 thereby generates intensity signal 64, 68, as shown in the intensity-time diagram 60 in the lower left corner of FIG. 3. The SMI sensors 18.1, 18.2 of the sensor unit 16 thus also deliver speed signals, as shown in the speed-time diagram 62 in the lower right corner of FIG. 3.

At a first time $T_1$, the object 14 that moves along the movement axis 12 on the transport medium 34 in a direction of movement 13 enters into the second measurement axis 22.2 of the second SMI sensor 18.2. Measurement light beams that were transmitted from the second SMI sensor 18.2 are reflected from the object 14 move at least in part along the second measurement axis 22.2 back to the second SMI sensor 18.2. Due to a different reflectivity of the transport medium 34 and the object 14 (a higher reflectivity of the object 14 in comparison with the transport medium 34 in the example), the intensity of the second measured signal 64 changes (dashed line in the intensity-time diagram 60). At the time $T_1$, a first characteristic change of the second measured signal 64 therefore takes place, namely an abrupt increase of the intensity that can be sensed by the second SMI sensor 18.2. Since the object 14 moves at the same speed v as the transport medium 34, the speed v determined by the second SMI sensor 18.2 and the corresponding first speed signal 66 (dashed line in the speed-time diagram 62) do not change.

At a second time $T_2$, measurement light beams transmitted by the first SMI sensor 18.1 are also reflected from the object 14 and move at least in part along the first measurement axis 22.1 back to the first SMI sensor 18.1. Due to different reflectivity of the transport medium 34 and the object 14, the intensity of the first measured signal 68 (chain-dotted line in the intensity-time diagram 60) also does not change here. At the time $T_2$, a first characteristic change of the first measured signal 68 therefore takes place, namely an abrupt increase of the intensity that can be sensed by the first SMI sensor 18.1. Since the object 14 moves at the same speed v as the transport medium 34, the speed determined by the first SMI sensor 18.1 and the corresponding first speed signal 70 (chain-dotted line in the speed-time diagram 62) also do not change.

At a third time $T_3$, the object 14 exits the first measurement axis 22.1 of the first SMI sensor 18.1. A second characteristic change of the first measured signal 68 thus takes place whose intensity again drops to the value before the second time $T_2$.

In the example described in FIG. 3, it is therefore possible to also determine the speed of the transport medium in addition to the object speed v. For the length determination, however, a sufficient difference of the reflectivity of the transport medium 34 and of the object 14 to be measured is necessary so that a characteristic change of the intensity of the measured signal can be sensed by the SMI sensors 18.1, 18.2 and the times $T_1$ to $T_3$ can thus be reliably determined. The length determination of the object 14 takes place as in the exampled described in FIG. 2.

Figure 4:
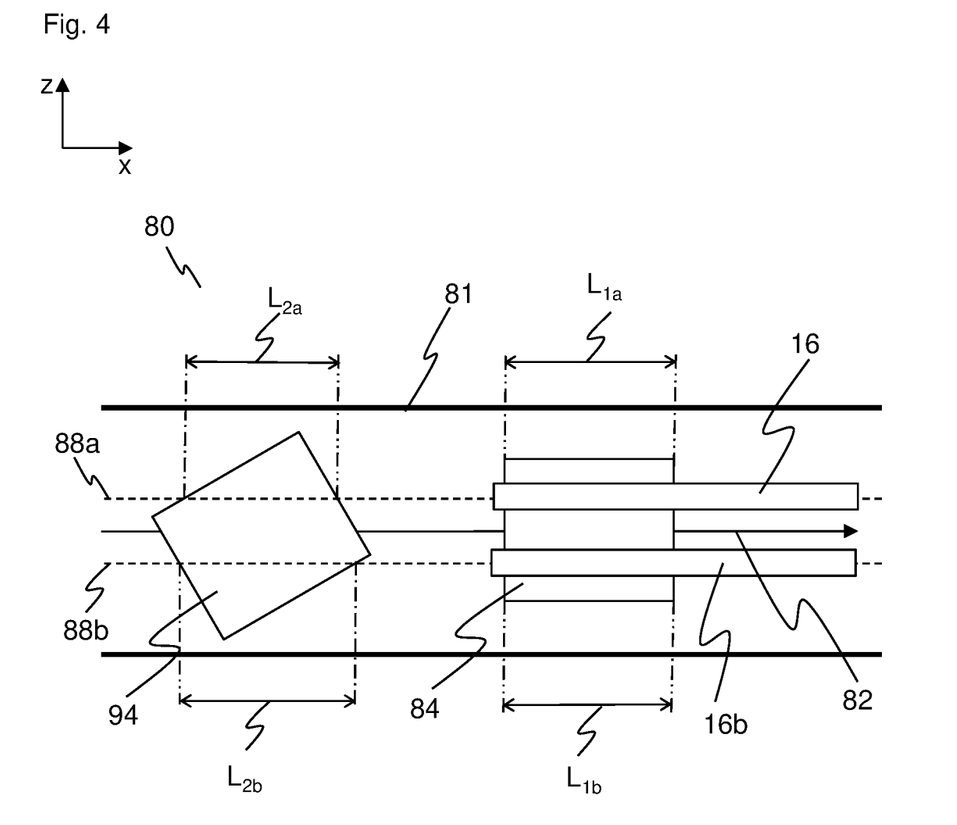
FIG. 4 a device in accordance with the invention for measuring an object moving along a movement axis using two sensor arrangements arranged in parallel.

FIG. 4 shows a schematic representation of a plan view of a further embodiment of a device 80 in accordance with the invention that has a first sensor arrangement 16 and a second sensor arrangement 16b as described in FIG. 1. The second sensor arrangement 16b can be designed like the first sensor arrangement 16, with the measurement axes of the SMI sensors of the first and second sensor arrangements 16, 16b being oriented such that the measurement axes lie in parallel measurement planes 88a, 88b.

If rectangular objects 84, 89 move on a first transport medium 81 along a movement axis 82 (for example packages on a conveyor belt) through the working zones of the sensor arrangements 16, 16b, the orientation of the objects 84, 94 on the transport medium 81 can be determined by determining the object lengths $L_{1a}$, $L_{1b}$, $L_{2a}$, $L_{2b}$ and the entry of the objects into the working zones or the exiting of the objects from the working zones of the SMI sensors of the sensor arrangements 16, 16b, that is by a comparison of time developments of characteristic signal changes.

If, for example as with the first object 84, the side surfaces of the first object are aligned in parallel with or perpendicular to the measurement planes 88a, 88b of the sensor arrangements 16, 16b, they determine, on the one hand, identical lengths $L_{1a}$, $L_{1b}$, $L_{2a}$, $L_{2b}$ of the first object 84 and, on the other hand, the first object 84 will simultaneously enter, within the framework of customary tolerances, the working zones of the SMI sensors of the sensor arrangements 16, 16*b*.

If, as with the second object 94, the side surfaces are not aligned in parallel with the measurement planes 88*a*, 88*b* of the sensor arrangements 86*a*, 86*b*, the second object 94 will, on the one hand, enter into the working zones of the SMI sensors of the sensor arrangements 86*a*, 86*b* at different times; on the other hand, the determined lengths $L_{2a}$, $L_{2b}$ of the second object 94 will differ.

If the dimensions of the object are known, the location of the objects 94 on the transport medium 81 can thus be determined.

The invention claimed is:

1. A device for measuring an object that moves in a direction of movement along a movement axis, the device comprising
    a first sensor arrangement having
        a first self-mixing interference sensor (SMI sensor) for transmitting first measurement light beams along a first measurement axis, for receiving first measurement light beams reflected back from a first working zone of the first SMI sensor, and for generating a first measured signal from the first measurement light beams reflected back, wherein the first SMI sensor is oriented in such a way that the transmitted first measurement light beams run at least in part in the direction of movement of the object,
        a second SMI sensor for transmitting second measurement light beams along a second measurement axis, for receiving second measurement light beams reflected back from a second working zone of the second SMI sensor, and for generating a second measured signal from the second measurement light beams reflected back, wherein the second SMI sensor is oriented in such a way that the transmitted second measurement light beams run at least in part against the direction of movement of the object,
        wherein the first working zone has an end remote from the first SMI sensor and the second working zone has an end remote from the second SMI sensor 18.2, and the ends define a measurement distance having a measurement distance length in parallel with the movement axis;
    a control and evaluation unit for receiving the first measured signal and the second measured signal and for determining a speed of the object along the movement axis from at least one of the measured signals,
wherein the control and evaluation unit is configured
    to detect a first characteristic change of the second measured signal at a first time;
    to detect a first characteristic change of the first measured signal at a second time;
    to detect a second characteristic change of the first measured signal at a third time; And
to determine an object length of the object along the movement axis while using the first time, the third time, the speed, and the measurement distance length.

2. The device in accordance with claim 1, wherein the control and evaluation unit is configured to store the speed over the time.

3. The device in accordance with claim 2, wherein the control and evaluation unit is configured to determine a length value at a variable speed by temporal integration of the variable speeds between the first time and the third time and to determine the length of the object along the movement axis from the length value and the measurement distance length.

4. The device in accordance with claim 3, wherein the measurement distance length is positive when the end of the first working zone remote from the first SMI sensor is arranged upstream of the end of the second working zone remote from the second SMI sensor in the direction of movement, is negative when the end of the first working zone remote from the first sensor is arranged downstream of the end of the second working zone remote from the second SMI sensor in the direction of movement, and the control and evaluation unit is configured to determine the length of the object by addition of the length value and the measurement distance length.

5. The device in accordance with claim 1, wherein the control and evaluation unit is configured to determine a length value at a constant speed of the object from a time difference between the third time and the first time and the constant speed and to determine the length of the object along the movement axis from the length value and the measurement distance length.

6. The device in accordance with claim 5, wherein the measurement distance length is positive when the end of the first working zone remote from the first SMI sensor is arranged upstream of the end of the second working zone remote from the second SMI sensor in the direction of movement, is negative when the end of the first working zone remote from the first sensor is arranged downstream of the end of the second working zone remote from the second SMI sensor in the direction of movement, and the control and evaluation unit is configured to determine the length of the object by addition of the length value and the measurement distance length.

7. The device in accordance with claim 1, wherein the first measurement axis has a first angle with respect to a plane perpendicular to the movement axis and the second measurement axis has a second angle with respect to the plane perpendicular to the movement axis, with the angles having different signs and with the amounts of the angles being the same.

8. The device in accordance with claim 1, wherein the first measurement axis and the second measurement axis lie in a common measurement plane.

9. The device in accordance with claim 8, wherein the movement axis of the object lies in the common measurement plane.

10. The device in accordance with claim 1, wherein the first measurement axis and the second measurement axis lie in parallel measurement planes.

11. The device in accordance with claim 10, wherein the movement axis of the object lies between the parallel measurement planes.

12. The device in accordance with claim 1, wherein the object is moved by a transport medium, with the transport medium being disposed in at least one working zone of the SMI sensors.

13. The device in accordance with claim 1, wherein the object is moved by a transport medium, with the transport medium being disposed outside the working zones of the SMI sensors.

14. The device in accordance with claim 1, wherein the control and evaluation unit is configured to determine the speed along the movement axis while using the first and second measured signals.

15. The device in accordance with claim 1, wherein the device has a second sensor arrangement having a third SMI sensor and a fourth SMI sensor, with the measurement axes of the third and fourth SMI sensors being aligned in parallel with the measurement axes of the first and second SMI sensors of the first sensor arrangement.

16. A method of measuring an object that moves in a direction of movement along a movement axis, the method comprising the steps of:
- transmitting first measurement light beams by a first self-mixing interference sensor (SMI sensor) of a first sensor arrangement along a first measurement axis, wherein the first SMI sensor is oriented in such a way that the transmitted first measurement light beams extend at least in part in the direction of movement of the object;
- receiving first measurement light beams reflected from a first working zone of the first SMI sensor;
  - generating a first measured signal from the reflected first measurement light beams;
- transmitting second measurement light beams by a second self-mixing interference sensor of the first sensor arrangement along a second measurement axis, wherein the second SMI sensor is oriented in such a way that the transmitted second measurement light beams extend at least in part against the direction of movement of the object;
  - receiving second measurement light beams reflected from a second working zone of the second SMI sensor;
  - generating a second measured signal from the reflected second measurement light beams;
- wherein the first working zone has an end remote from the first SMI sensor and the second working zone has an end remote from the second SMI sensor and the ends define a measurement distance having a measurement distance length in parallel with the movement axis;
- receiving the first measured signal and the second measured signal by a control and evaluation unit; and
- determining a speed along the movement axis from at least one of the measured signals,
- detecting a first characteristic change of the second measured signal at a first time;
- detecting a first characteristic change of the first measured signal at a second time;
- detecting a second characteristic change of the first measured signal at a third time; and
- determining a length of the object along the movement axis while using the first time, the third time, the speed, and the measurement distance length.

\* \* \* \* \*